US 6,653,612 B2

(12) United States Patent
Hashimoto (10) Patent No.: US 6,653,612 B2
(45) Date of Patent: *Nov. 25, 2003

(54) OPTICAL PICKUP AND AN OPTICAL DISC DRIVE USING SUCH OPTICAL PICKUP

(75) Inventor: Minoru Hashimoto, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/511,536

(22) Filed: Feb. 23, 2000

(65) Prior Publication Data

US 2003/0076770 A1 Apr. 24, 2003

(30) Foreign Application Priority Data

Feb. 25, 1999 (JP) .......................... 11-047382

(51) Int. Cl.[7] ............................................... G02B 7/04
(52) U.S. Cl. .................. 250/201.5; 250/216; 369/44.26
(58) Field of Search .......................... 250/201.5, 201.2, 250/216, 559.4; 369/44.14, 44.23, 44.26

(56) References Cited

U.S. PATENT DOCUMENTS 5,796,701 A * 8/1998 Nishi et al. ............ 369/110.02
6,075,659 A * 6/2000 Murayama et al. ......... 359/813
6,147,941 A * 11/2000 Kumagai ................. 369/44.26

FOREIGN PATENT DOCUMENTS

JP 02000123398 A * 4/2000

\* cited by examiner

*Primary Examiner*—Que T. Le
(74) *Attorney, Agent, or Firm*—Frommer Lawrence & Haug LLP; William S. Frommer; Dennis M. Smid (57) ABSTRACT

An optical pickup is provided which is constructed from a single optical integrated device adapted to write data to, and/or read data from, more than one type of optical disc such as CD, DVD and the like. The optical integrated device includes means for selectively providing as output a result of the light detection by one of a plurality of light detecting elements. This selective output means makes it unnecessary to provide added terminals at the optical integrated device. There is also provided an optical disc drive using the optical pickup.

11 Claims, 5 Drawing Sheets

OPTICAL PICKUP AND AN OPTICAL DISC DRIVE USING SUCH OPTICAL PICKUP

BACKGROUND OF THE INVENTION

1. Field of the Invention

The present invention relates to an optical pickup or an optical disc drive, adapted to write data to, and/or read data from, any of optical discs different in format from each other, such as compact disc (CD), digital video disc or digital versatile disc (DVD), etc. More particularly, the present invention relates to an optical pickup or optical disc drive including an optical integrated device package in which there is provided means for selecting, and providing as an output, one of results of light incidence upon a plurality of photodetectors. According to the present invention, the single optical integrated device permits to write data to, and read data from, any of different types of optical discs without increasing the number of terminals of the optical integrated device package.

2. Description of the Related Art

The conventional optical disc drive or CD player is adapted to irradiate a laser beam from an optical pickup onto an information recording surface of a CD and process a detection result of a return light from the CD surface to read or reproduce a variety of data recorded in the CD.

The conventional optical pickups include a type having a light source and photodetector disposed separately therein, and a type using an optical integrated device consisting integrally of a light source and photodetector. The U.S. Pat. Nos. 4,873,429 and 4,733,067 disclose examples of the optical pickups of the latter type. This type of optical pickup can be designed compact and have an improved reliability.

It is considered that using such an optical integrated device to build the optical pickup also in a an optical disc drive for DVD, a so-called DVD player, for example, the DVD player can be designed compact and simple. A DVD player designed compatible with a CD as well will be very conveniently usable.

In this case, by forming an optical integrated device integrally from a light source and photodetector for DVD and a light source and photodetector for CD, an optical disc player compatible with both CD and DVD can be provided.

However, when one optical integrated device is formed from two different types of light sources and photodetectors, it needs two systems for output of detected light. Namely, many terminals have to be provided on the package of the optical integrated device.

The provision of many terminals on the optical integrated device package will result in a complicate wiring of the terminals, and the package itself will not be usable with a high versatility.

OBJECT AND SUMMARY OF THE INVENTION

It is therefore an object of the present invention to overcome the above-mentioned drawbacks of the prior art by providing an optical pickup constructed from a single optical integrated device adapted to write data to, and/or read data from, more than one type of optical disc with no added terminals for the device, and an optical disc drive using the optical pickup.

According to the present invention, there is provided an optical pickup adapted to detect a return light from an optical disc by a light detecting means and provide as output a result of the light detection by the light detecting means, the optical pickup including;

optical means for emitting and converging a light onto an optical disc;

a plurality of light detecting elements forming together the light detecting means;

an optical integrated device housing the plurality of light detecting elements; and means for selectively providing as output a result of the light detection by the light detecting means according to the type of the optical disc.

According to the present invention, there is also provided an optical disc drive using an optical pickup which detects a return light from an optical disc by a light detecting means and provides as output a result of the light detection by the light detecting means, and adapted to read data from the optical disc by processing the light detection result output from the optical pickup, the optical pickup including:

optical means for emitting and converging a light onto an optical disc;

a plurality of light detecting elements forming together the light detecting means;

an optical integrated device housing the plurality of light detecting elements; and means for selectively providing as output a result of the light detection by the light detecting means according to the type of the optical disc.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIG. 3A is a plan view.

Figure 2:
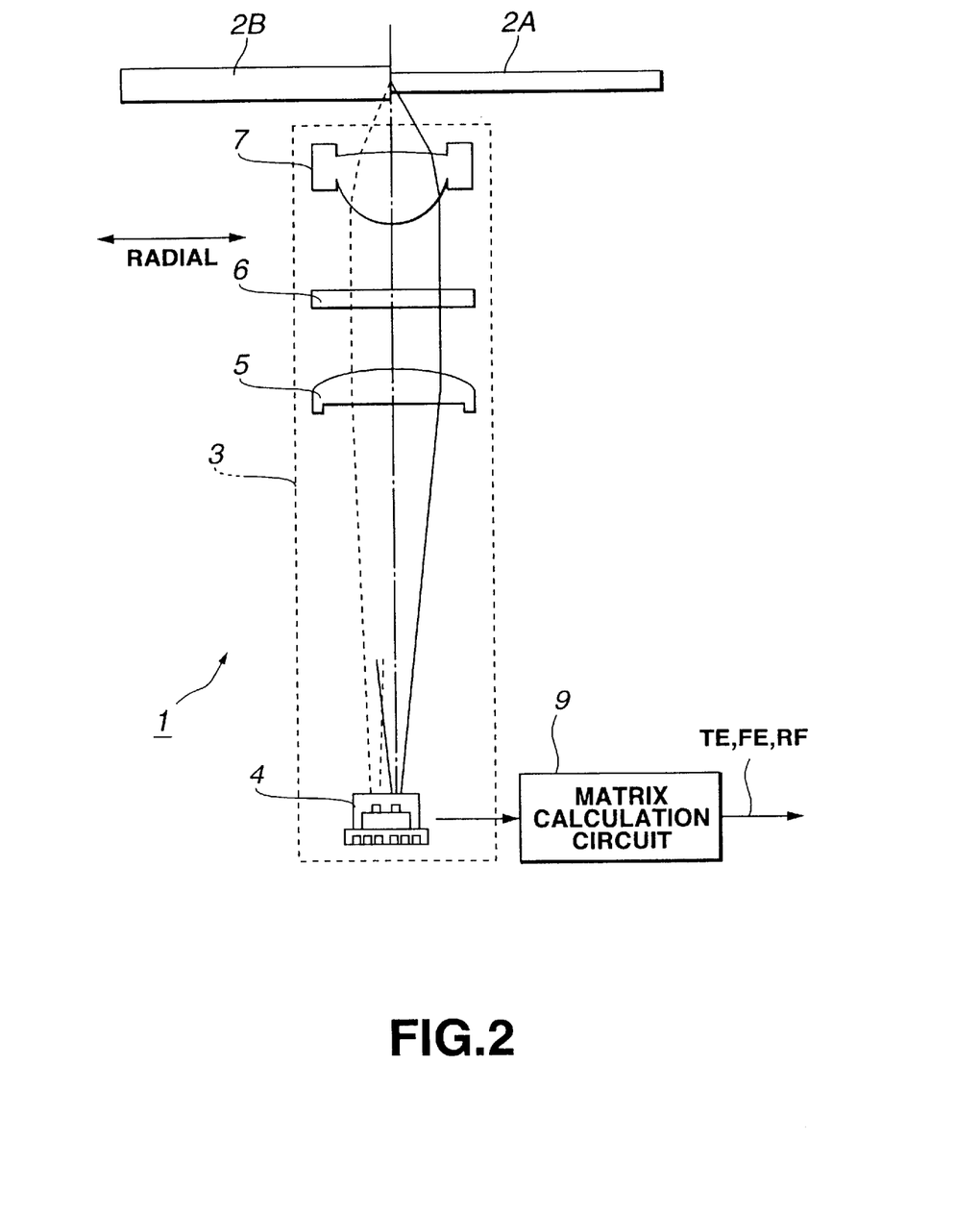
FIG. 2 is a schematic diagram of the optical disc drive according to the present invention.

DETAILED DESCRIPTION OF THE PREFERRED EMBODIMENTS (1) Overall Construction of an Embodiment Referring now to FIG. 2, there is schematically illustrated an embodiment of the optical disc drive according to the present invention. The optical disc drive is generally indicated with a reference 1. In FIG. 2, two types of optical disc, DVD 2A being an optical disc having a DVD format and compact disc (CD) 2B being an optical disc having a CD format, are shown together for the convenience of illustration and description of the optical disc drive 1.

The DVD 2A is an optical disc from which recorded data can be read by irradiating a laser beam to an information recording surface of the disc through a transparent substrate of 0.6 mm in thickness and processing a return light from the information recording surface. The CD 2B is an optical disc from which recorded data can be read by irradiating a laser beam to an information recording surface of the disc through a transparent substrate of 1.2 mm in thickness and processing a return light from the information recording surface.

In this optical disc drive 1, an optical pickup 3 is disposed to be movable radially of the optical disc by a predetermined sled mechanism. As shown in FIG. 2, the optical pickup 3 consists of an optical integrated device 4, collimator lens 5, aperture 6 and an objective lens 7. A laser beam emitted from the optical integrated device 4 is irradiated to the optical disc 2A or 2B through the collimator lens 5, aperture 6 and objective lens 7. On the contrary, a return light from the optical disc 2A or 2B is incident upon the optical integrated device 4 through the objective lens 7, aperture 6 and collimator lens 5.

The optical integrated device 4 is formed from a light source and photodetector for CD and a light source and photodetector for DVD both integrally disposed in one package. The optical integrated device 4 has two semiconductor laser diode chips for the light sources, respectively, disposed about 100 μm apart from each other radially of the optical disc 2A or 2B. These semiconductor laser diode chips are selectively driven under the control of a system controller (not shown) depending upon which is currently used, the optical disc 2A or 2B. Thus, the optical integrated device 4 selectively emits a laser beam of a wavelength corresponding to the optical disc 2A or 2B towards the optical disc 2A or 2B, and a return light from the optical disc 2A or 2B is detected by a corresponding photodetector.

The collimator lens 5 converts the laser beam from the optical integrated device 4 to a nearly parallel beam.

The aperture 6 is a transparent plate with a dielectric layer evaporated thereon and a circular opening formed in the center thereof. Namely, the aperture 6 has the dielectric layer around the central opening formed therein. The dielectric layer serves as a filter to selectively intercept a laser beam of 780 nm in wavelength for CD while allowing a laser light of 650 nm in wavelength for DVD to penetrate through it. Thus, the aperture 6 will shape the incident laser beam for CD to be a beam having a diameter depending upon the diameter of the opening, while allowing the laser beam for DVD to pass through the aperture 6 with the shape thereof not changed at all.

The objective lens 7 is an aspheric plastic lens formed from a transparent resin by injecting molding. By selecting an appropriate refractive index of the transparent resin and shape of the lens surface, the objective lens 7 is formed to focus the incident parallel laser beam for DVD or CD onto the information recording surface of the optical disc 2A or 2B. Thus, the objective lens 7 is formed as a so-called bifocal lens for both the laser beams for DVD and CD, respectively.

Further, the objective lens 7 is movable by an actuator composed of a voice-coil motor radially of the optical disc 2A or 2B and along the optical axis for the tracking control and focus control. Moreover, driven by the actuator, the objective lens 7 is moved radially of the optical disc 2B when a laser beam for CD is used. Thus, the optical disc drive 1 is adapted to prevent the optical property from being deteriorated by a deviation of the laser beam from the optical axis, which would otherwise be likely to take place when a laser beam is irradiated from one of the two light sources disposed apart from each other to a corresponding one of the optical discs 2A and 2B through a common optical system.

The optical disc drive 1 further comprises a matrix calculation circuit 9 as shown in FIG. 2. The matrix calculation circuit 9 provides a matrix calculation of a result of the light detection output from the optical integrated device 4 to produce a tracking error signal TE whose level varies depending upon the magnitude of a tracking error, focus error signal FE whose level varies depending upon the magnitude of a focus error, and a read signal RF whose level varies depending upon the pit train. The matrix calculation circuit 9 produces a tracking error signal, focus error signal and read signal for each of DVD and CD.

The optical disc drive 1 reads data from the optical disc 2A or 2B by moving the objective lens 7 in accordance with the tracking error signal and focus error signal to control the tracking and focus and processing the read signal.

(2) Construction of the Optical Integrated Device 4

Figure 3A:
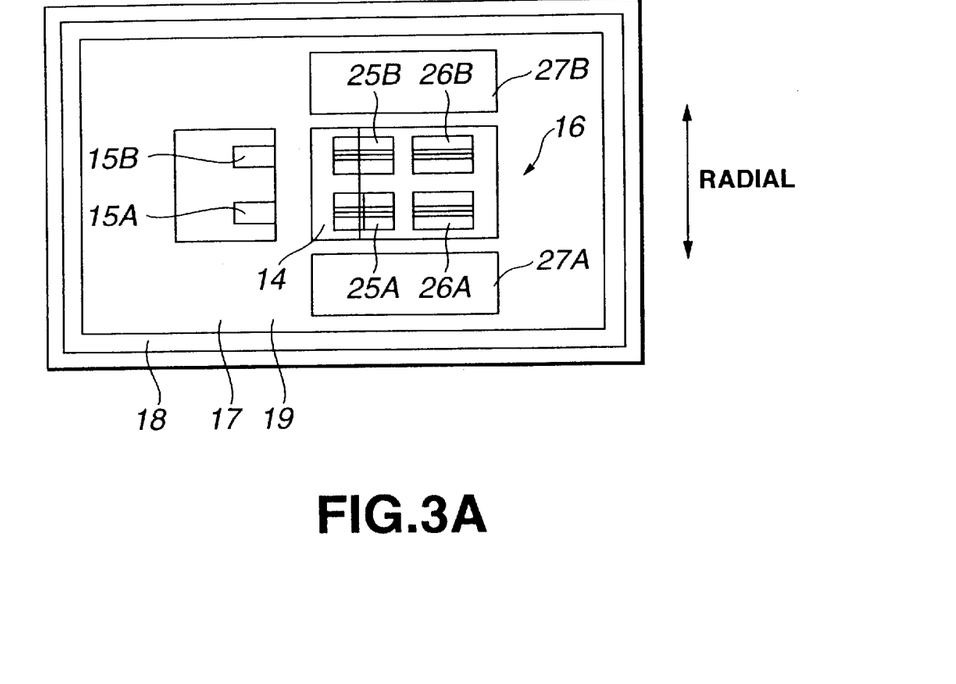
Figure 3B:
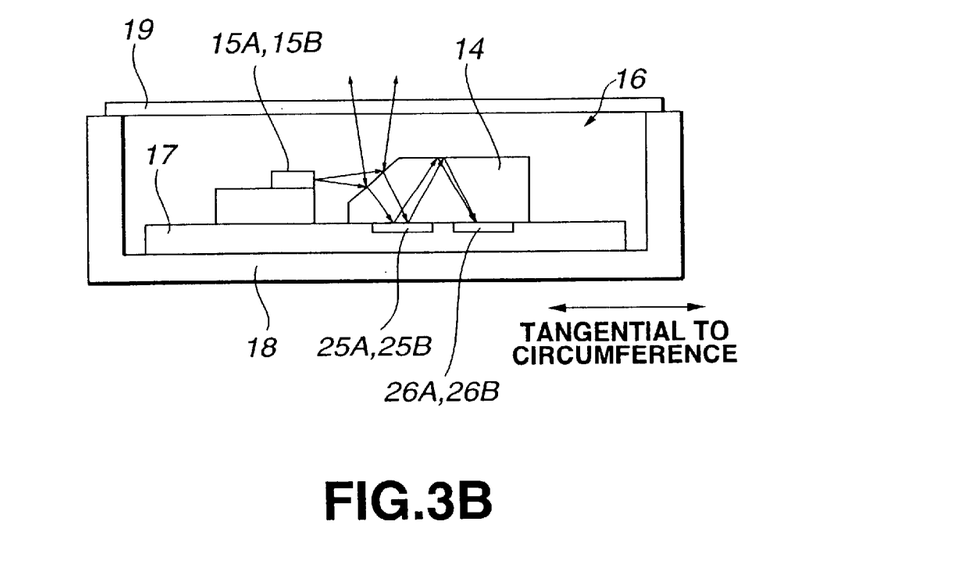
FIG. 3B is a sectional view, of the optical integrated device included in the optical pickup in FIG. 2.

FIG. 3A is a plan view, from the emitted direction of the laser beam, of the optical integrated device 4, and FIG. 3B is a sectional view, taken along the direction tangential to the circumference of the optical disc 2A or 2B, of the optical integrated device 4. The optical integrated device 4 is constructed by disposing a prism 14, and semiconductor laser diode chips 15A and 15B on a semiconductor substrate 17 to form a light source/photodetector assembly 16, putting the light source/photodetector 16 in a package 18 and wiring it, and then sealing the package 18 with a transparent glass 19.

The semiconductor laser diode chips 15A and 15B are disposed apart by about 100 μm from each other radially of the optical disc 2A or 2B and emit a laser beam having a wavelength of 650 nm for DVD and a laser beam having a wavelength 780 nm for CD, respectively, towards the prism 14. Note that a single semiconductor laser diode may be used as a light source to emit two laser beams.

The prism 14 is provided to separate the laser beam and return light from each other. It is formed to have a generally rectangular shape having a slope at one lateral side thereof. Thus, a laser beam emitted from the semiconductor laser diode chip 15A or 15B is reflected at the slope of the prism 14 towards the collimator lens 5, and a return light having traveled reversely along the optical path of the laser beam and incident upon the prism 14 is guided inwardly of this slope.

At the prism 14, the return light incident upon the slope is incident upon the bottom of the prism 14. About 50% of the return light is penetrated through the prism bottom while the remainder is reflected towards the top of the prism 14. The return light incident upon the prism top is reflected nearly 100% there towards the prism bottom and allowed to outgo through the prism bottom.

For the above reflection of the return light, the prism 14 has a mirror surface formed by evaporation on the top thereof. Also the prism 14 has a beam splitting surface formed on a portion of the bottom thereof at the slope side (will be referred to as "front side" hereinafter) and a light transmissive surface formed on a portion of the bottom thereof at the side away from the slope (will be referred to as "rear side" hereinafter) so that the ratio in amount between the return light allowed to outgo through the prism bottom at the front-side portion and that allowed to outgo through the prism bottom at the rear-side portion will be nearly 1:1. The beam splitting surface and light-transmissive surface are formed by the similar evaporation to that used in forming the mirror surface.

The semiconductor substrate 17 has light-incident surfaces 25A and 26A for DVD and light-incident surfaces 25B and 26B for CD formed on portions, respectively, thereof upon which the return portion of the laser beam for DVD and that of the laser beam for CD are incident from the prism 14. Also the semiconductor substrate 17 has formed a signal processing circuit 27A for DVD and a signal processing circuit 27B for CD in vicinity of the light-incident surfaces, respectively.

The light-incident surfaces 25A and 25B are disposed correspondingly to the front-side portion of the prism 14, while the light-incident surfaces 26A and 26B are disposed correspondingly to the rear-side portion.

Figure 4:
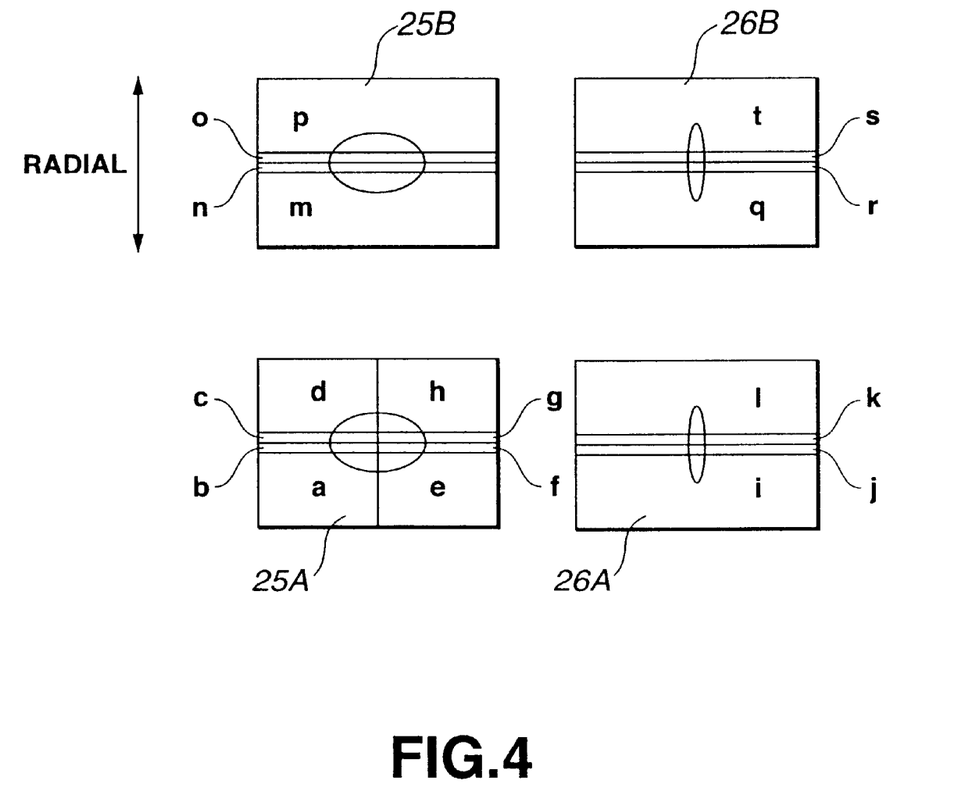
FIG. 4 is a plan view, enlarged in scale, of the light-incident surfaces of the optical integrated device in FIG. 3.

FIG. 4 is a plan view, partially enlarged in scale, of the light detection systems for CD and DVD, respectively, formed from the above-mentioned light-incident surfaces of the optical integrated device 4. For the optical integrated device 4, the directions of the semiconductor laser diode chips 15A and 15B and size of the prism 14 are selected so that when the laser beam is just focused, a beam spot defined on the semiconductor substrate 17 by the return light having passed through the prism 14 will be formed, at the rear-side portion, like a focal line, and at the front-side portion, like an ellipse having the major axis thereof directed perpendicularly to the extension of the focal line at the rear-side portion.

The light-incident surfaces 25B and 26B for CD are formed side by side tangentially to the circumference of CD to have a general shape of a rectangle, and each is divided radially of CD by a parting line extending tangentially to the circumference of CD. Thus, when the optical head is just on an intended track on a CD, each of the light-incident surfaces 25B and 26B can detect a beam spot defined thereon and quartered radially of CD. Namely, a result of light detection by each of the quartered light-incident surfaces is provided as output. In FIG. 4, the outer light-incident surface divisions at the front-side portion are indicated with references m and p, respectively, while the inner ones are indicated with references n and o, respectively. The outer light-incident surface divisions at the rear-side portion are indicated with references q and t, respectively, while the inner ones are indicated with references r and s, respectively.

The light-incident surfaces 25A and 26A for DVD are formed side by side tangentially to the circumference of the optical disc 2A in the similar manner to that for the light-incident surfaces 25B and 26B, to have a general shape of a rectangle. The light-incident surface 26A at the rear-side portion is formed similarly to the light-incident surface 26B at the rear-side portion for CD.

The light-incident surface 25A at the front-side portion is formed similarly to the light-incident surface 25B at the front-side portion for CD, and further it is divided by two tangentially to the circumference of the optical disc. Thus, the semiconductor substrate 17 can produce a tracking error signal by the so-called differential phase detection (DPD). As shown in FIG. 4, the outer and on-slope light-incident surface divisions for DVD at the front-side portion are indicated with references a and d, respectively, and the inner and under-slope light-incident surface divisions at the front-side portion are indicated with references b and c, respectively. Further, the outer and off-slope light-incident surface divisions at the front-side portion are indicated with references e and h, respectively, and the inner and off-slope light-incident surface divisions at the front-side portion are indicated with references f and g, respectively. Also, the outer light-incident surface divisions at the rear-side portion are indicated with references i and l, respectively, and the inner light-incident surface divisions at the rear-side portion are indicated with references j and k, respectively.

Figure 1:
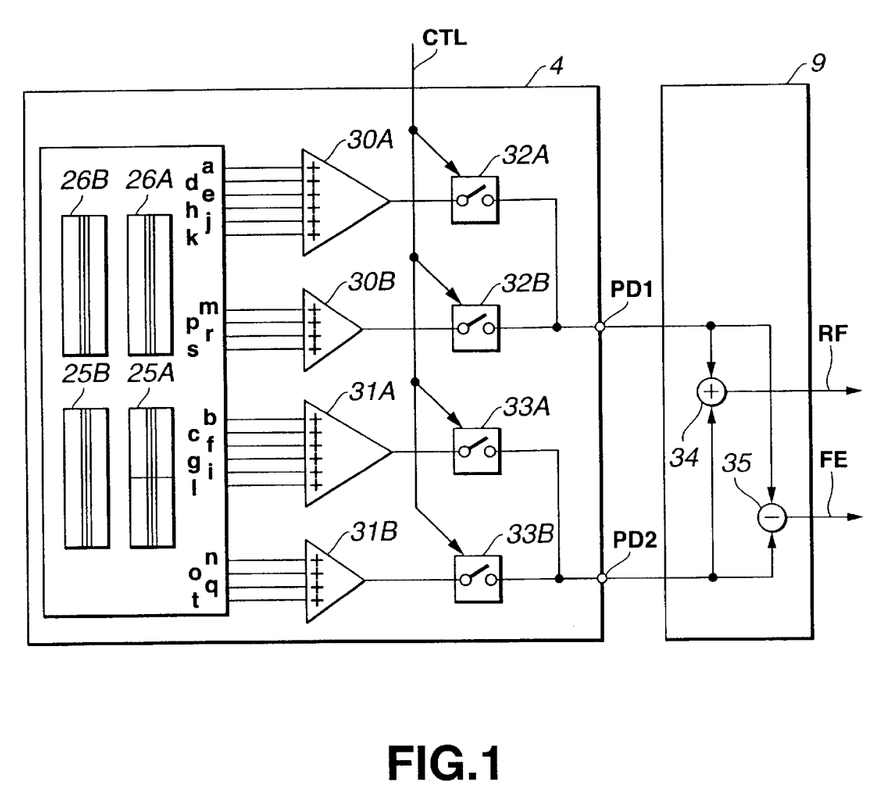
FIG. 1 is a block diagram of an optical integrated device and a matrix calculation circuit, explaining the read signal and focus error signal.

Referring now to FIG. 1, there is illustrated in the form of a block diagram the optical integrated device 4 and matrix calculation circuit 9. FIG. 1 explains the production of a focus error signal. In the optical integrated device 4, the DVD signal processing circuit 27A and CD signal processing circuit 27B convert the results of light detection from the light-incident surface divisions a to t from current to voltage.

The optical integrated device 4 includes also an adder circuit 30A which adds the results of light detection from the outer light-incident surface divisions a, d, e and h of the front-side light-incident surface 25A for DVD, among the results of current/voltage conversion, to the results of light detection from the inner light-incident surface divisions j and k of the rear-side light-incident surface 26A for DVD. In addition, the optical integrated device 4 includes another adder circuit 30B which adds the results of light detection from the outer light-incident surface divisions m and p of the front-side light-incident surface 25B for CD, among the results of current/voltage conversion, to the results of light detection from the inner light-incident surface divisions r and s of the rear-side light-incident surface 26B for CD.

Also the optical integrated device 4 includes an adder circuit 31A which adds the results of light detection from the inner light-incident surface divisions b, c, f and g of the front-side light-incident surface 25A for DVD, among the results of current/voltage conversion, to the results of light detection from the outer light-incident surface divisions i and l of the rear-side light-incident surface 26A for DVD. The optical integrated device 4 further includes an adder circuit 31B which adds the results of light detection from the inner light-incident surface divisions n and o of the front-side light-incident surface 25B for CD, among the results of current/voltage conversion, to the results of light detection from the outer light-incident surface divisions q and t of the rear-side light-incident surface 26B for CD.

The optical integrated device 4 further includes switching circuits 32A and 32B, and 33A and 33B. The switching circuits 32A and 32B are supplied with a control signal CTL from the system controller of the optical disc drive 1 and operated in a complementary manner (namely, when the switching circuit 32A is opened, for example, the switching circuit 32B is closed) under the control signal CTL to deliver output signals from the adder circuits 30A and 30B at a first terminal PD1 common to both the switching circuits 32A and 32B. Similarly, the switching circuits 33A and 33B are supplied with the control signal CTL and operated in the complementary manner under the control signal CTL to deliver output signals from the adder circuits 31A and 31B at a second terminal PD2 common to the switching circuits 33A and 33B.

As shown, the matrix calculation circuit 9 includes an adder circuit 34 which adds the output signals from the first and second terminals PD1 and PD2 to produce a read signal RF. Thus, the matrix calculation circuit 9 will produce a read signal RF expressed by (m+n+o+p+q+r+s+t) when the outputs from the light-incident surface divisions for CD are selected under the control of the system controller, while producing a read signal RF expressed by (a+b+c+d+e+f+g+h+i+j+k+l) when the outputs from the light-incident surface divisions for DVD are selected under the control of the system controller.

Also the matrix calculation circuit 9 includes a subtraction circuit 35 which subtracts the output signals at the second terminal PD2 from the output signals at the first terminal PD1 to produce a focus error signal FE. Thus, the matrix calculation circuit 9 produces a focus error signal FE expressed by (m+p+r+s)−(n+o+q+t) when the outputs from the light-incident surface divisions for CD are selected, while producing a focus error signal FE expressed by (a+d+e+h+j+k)−(b+c+f+g+i+l) when the outputs from the light-incident surface divisions for DVD are selected.

Figure 5:
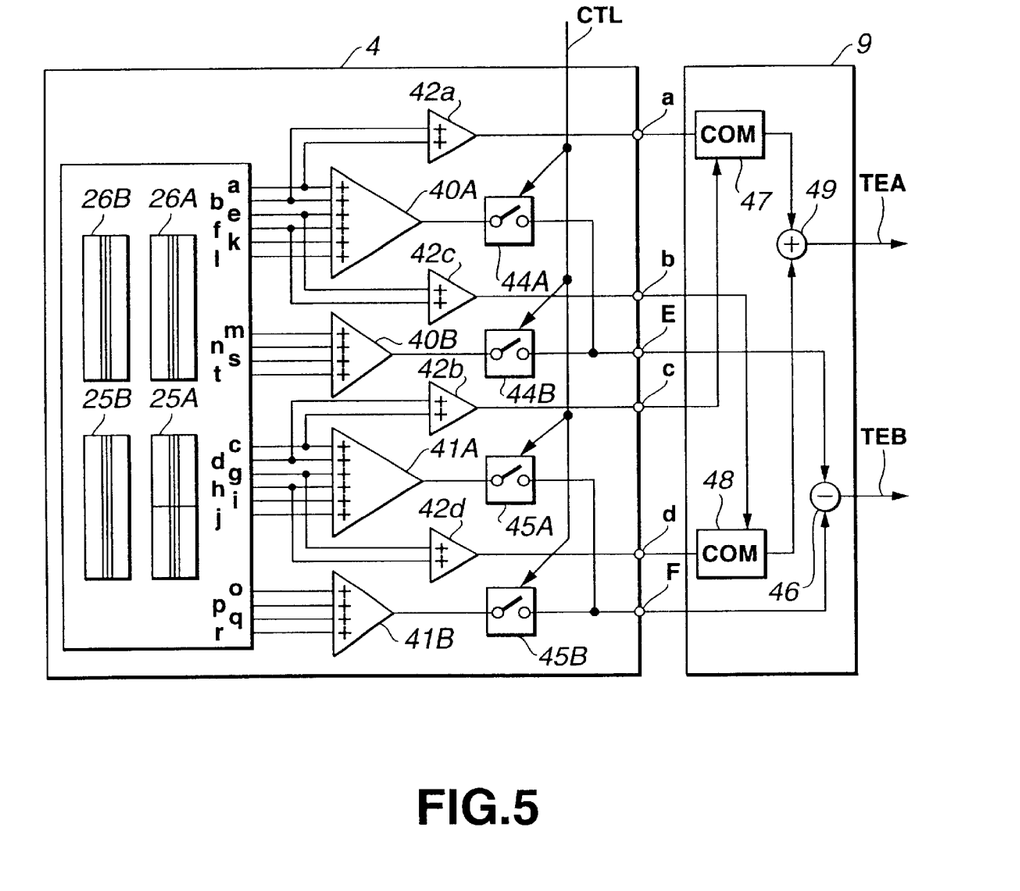
FIG. 5 is a block diagram of the optical integrated device and matrix arithmetic circuit, explaining the tracking error signal.

Referring now to FIG. 5, there is schematically illustrated in the form of a block diagram the optical integrated device 4 and matrix arithmetic circuit 9. FIG. 5 explains the production of a tracking error signal. In the optical integrated device 4, the DVD signal processing circuit 27A includes an adder circuit 40A which adds the results of light detection from the outer light-incident surface divisions a, b, e and f at the outer circumference side of the front-side light-incident surface 25A for DVD, among the results of current/voltage conversion, to the results of light detection from the inner light-incident surface divisions k and l at the inner circumference side of the rear-side light-incident surface 26A for DVD. In addition, the optical integrated device 4 another adder circuit 41A which adds the results of light detection from the outer light-incident surface divisions c, d, g and h at the inner circumference side of the front-side light-incident surface 25A for DVD, among the results of current/voltage conversion, to the results of light detection from the inner light-incident surface divisions i and j at the outer circumference side of the rear-side light-incident surface 26A for DVD.

Also the optical integrated device 4 includes an adder circuit 40B which adds the results of light detection from the inner light-incident surface divisions m and n at the inner circumference side of the front-side light-incident surface 25B for CD, among the results of current/voltage conversion, to the results of light detection from the outer light-incident surface divisions s and t at the inner circumference side of the rear-side light-incident surface 26B for CD. The optical integrated device 4 further includes an adder circuit 41B which adds the results of light detection from the inner light-incident surface divisions o and p at the inner circumference side of the front-side light-incident surface 25B for CD, among the results of current/voltage conversion, to the results of light detection from the outer light-incident surface divisions q and r at the outer circumference side of the rear-side light-incident surface 26B for CD.

Also the optical integrated device 4 includes an adder circuit 42$a$ which adds together the results of light detection from the front-side near-slope light-incident surface divisions a and b for DVD at the outer circumference side, an adder circuit 42$b$ which adds together the results of light detection from the front-side near-slope light-incident surface divisions c and d for DVD at the inner circumference side, an adder circuit 42$c$ which adds together the results of light detection from the rear-side off-slope light-incident surface divisions e and f for DVD at the outer circumference side, and an adder circuit 42$d$ which adds together the results of light detection from the front-side off-slope light-incident surface divisions g and h for DVD at the inner circumference side.

The optical integrated device 4 deliver at terminals a to d thereof the results of addition from the adder circuits 42$a$ to 42$d$. The optical integrated device 4 includes switching circuits 44A and 44B which are supplied with a control signal CTL from the system controller of the optical disc drive 1 and operated in the complementary manner under the control signal CTL. The results of addition from the adder circuits 40A and 40B are delivered at a third terminal E common to the switching circuits 44A and 44B. The optical integrated circuit 4 includes also switching circuits 45A and 45B which are supplied with the control signal CTL and operated in the complementary manner under the control signal CTL. The results of addition from the adder circuits 41A and 41B are delivered at a fourth terminal F common to the switching circuits 45A and 45B.

As shown, the matrix calculation circuit 9 includes a subtraction circuit 46 which subtracts the output signals at the fourth terminal F from the output signals at the third terminal E to produce a tracking error signal TEB. Thus, the matrix calculation circuit 9 delivers from the subtraction circuit 46 a tracking error signal expressed by (m+n+s+t)−(o+p+q+r) when the outputs from the light-incident surface divisions for CD are selected under the control of the system controller, while delivering at the subtraction circuit 46 a tracking error signal expressed by (a+b+e+f+k+l)−(c+d+g+h+i+j) when the outputs from the light-incident surface divisions for DVD are selected under the control of the system controller.

Further the matrix calculation circuit 9 includes a phase comparator 47 which are supplied with the results of light detection from terminals a to c and compares the phases of them, and also a phase comparator 48 which are supplied with the results of light detection from terminals b and d and compares the phases of them. The matrix calculation circuit 9 includes also an adder circuit 49 which adds together the results of phase comparison from the phase comparators 47 and 48. Thus, the matrix calculation circuit 9 produces a tracking error signal TEA by the DPD method.

The tracking error signals TEA and TEB are used as follows. Namely, the optical disc drive 1 controls the tracking on a CD with the tracking error signal TEB from the subtraction circuit 46 while controlling the tracking on a DVD with the tracking error signal TEA produced by the DPD method.

(3) Operation of the Embodiment

In the optical disc drive 1 constructed as having been described in the foregoing with reference to FIG. 2, the optical pickup 3 irradiates a laser beam to the optical disc 2A or 2B and detects a return light from the optical disc, and a selected one of the signal processing circuits processes the result of return light detection, thereby reading information from the optical disc 2A or 2B.

More particularly, a laser beam is emitted from the optical integrated device 4 of the optical pickup 3 incorporated in the optical disc drive 1, converted to a nearly parallel beam by the collimator lens 5, passed through the aperture 6, and guided to the objective lens 7 which will focus the laser beam onto an information recording surface of the optical disc 2A or 2B. A return light resulted from reflection of the laser beam at the information recording surface is passed through the objective lens 7 and incident upon the optical integrated device 4 which provides a result of return light detection as output.

When the optical disc (2A or 2B) loaded in the optical disc drive 1 is a DVD (namely, 2A), one of the semiconductor laser diode chips 15A and 15B disposed side by side in the optical integrated device 4 radially of the optical disc 2A or 2B (see FIG. 3), that is, the semiconductor laser diode chip 15A, is selected to emit a laser beam towards the DVD 2A, and a return light from the DVD 2A is detected by the light-incident surfaces 25A and 26A for DVD via the prism 14, as shown in FIG. 4.

On the contrary, when the optical disc loaded in the optical disc drive 1 is CD (namely, 2B), the semiconductor laser diode chip 15B (see FIG. 3) is selected to emit a laser beam towards the CD 2B, and a return light from the CD 2B is detected by the light-incident surfaces 25B and 26B for CD via the prism 14, as also shown in FIG. 4.

Thus, the optical disc drive 1 processes the results of light detection from the CD or DVD photodetectors to read information from the CD or DVD.

For the processing the results of light detection, the results of light detection are collected from the CD and DVD photodetectors, respectively, so that the adder circuits 30A, 30B, 31A and 31B of the optical integrated device 4 (as shown in FIG. 1) can produce a focus error signal and read signal, and then delivered at the common terminals PD1 and PD2, respectively, through the switching circuits 32A, 32B, 33A and 33B which are operated in the complementary manner under the control signal CTL. Correspondingly to the outputs at the terminals PD1 and PD2, the matrix calculation circuit 9 adds and subtracts the output signals at the common terminals PD1 and PD2 to produce a read signal RF and focus error signal FE.

Thus, even if a plurality of photodetectors for DVD and CD is disposed together in a single package of the optical integrated device 4, it is not necessary to provide any added terminals.

Similarly, to thereby producing a tracking error signal, the results of light detection are collected from the CD and DVD photodetectors and then delivered at the common terminals E and F through the switching circuits 44A, 44B, 45A and 45B which are operated in the complementary manner under the control signal CTL. For a tracking error signal produced by the DPD method, the results of light detection are collected by the adder circuits 42a to 42d, respectively and delivered at the terminals a to d.

Thus, the matrix calculation circuit 9 can produce a tracking error signal by selectively processing the outputs from two photodetector systems. That is, when a CD is used in the optical disc drive 1, since the pit depth of the CD is $\lambda/8$ of the wavelength, the tracking error signal TEB from the subtraction circuit 46 can be used for CD tracking control. On the contrary, since the pit depth of a DVD is $\lambda/4$ of the wavelength, the tracking error signal TEA produced by the DPD method and provided by the adder circuit 49 can be used for DVD tracking control.

The optical integrated device 4 delivers at the common terminals E and F the results of light detection based on which the CD tracking error signal TEB is produced or the results of light detection for production of the DVD tracking error signal TEA, whichever are selected by the switching circuits 44A, 44B, 45A and 45B which are operated in the complementary manner. Thus, the optical disc drive 1 can accommodate various types of optical discs since the tracking control can be done under the tracking error signal TEB common to the CD instead of the tracking error signal TEA produced by the DPD method.

(4) Effect of the Embodiment

As having been described in the foregoing, the switching circuits 32A, 32B, 33A and 33B as means for selective output of the results of light detection from the plurality of photodetector systems are provided in the optical integrated device 4 so that even for reading data from or writing data to more than one type of optical disc by the single optical integrated device 4, no additional terminals have to be provided on the optical integrated device package.

(5) Other Possible Embodiments

The present invention has been described concerning the embodiment in which intermediate signals produced in the course of a tracking error signal, focus error signal and read signal being produced are selectively delivered from the optical integrated device. However, the present invention is not limited to this embodiment, but a tracking error signal, focus error signal and read signal being final results of processing of the results of light detection are produced inside the optical integrated device and delivered selectively.

In the foregoing, the present invention has been described as to the embodiment in which the switching circuits are operated in the complementary manner under the control signal CTL from the system controller. However, the present invention is not limited to this embodiment but the switching circuits may be operated as interlocked with the selection of semiconductor laser diode chips under the control of the internal circuit of the optical integrated device, which will contribute to a further decreased number of the terminals.

The present invention has been described in the foregoing concerning the embodiment adapted to be compatible with both a CD and DVD. However, the present invention is not limited to this embodiment, but can be adapted to be compatible with both a CD and a recordable compact disc such as CD-R.

The present invention has been described concerning the embodiment in which two different types of optical disc are read by the single optical pickup. However, the present invention is not limited to this embodiment, but can be adapted to read more than two types of optical disc.

The present invention has been described in the foregoing as to the embodiment in which the optical pickup is constructed from the optical integrated device formed integrally from a light source and photodetector. However, the present invention is not limited to this embodiment, but it can be adapted such that the light source and photodetector are disposed separately from each other.

As having been described in the foregoing, the optical pickup according to the present invention is constructed from a single optical integrated device adapted to write data to, and/or read data from, more than one type of optical disc such as CD, DVD and the like. The optical integrated device includes means for selectively providing as output a result of the light detection by one of a plurality of light detecting elements. This selective output means makes it unnecessary to provide added terminals at the optical integrated device. There is also provided an optical disc drive using the optical pickup.

What is claimed is:

1. An optical pickup adapted to detect a return light from an optical disc and provide as output a result of the light detection, the optical pickup comprising;

optical means having a first light source and a second light source for emitting and converging a light onto an optical disc;

light detecting means having at least a first portion and a second portion each having a plurality of light incident surfaces for detecting light, in which the first and second portions are provided on a semiconductor substrate and in which each light incident surface of said first portion is separate from each other and each light incident surface of said second portion is separate from each other; and an optical integrated device housing the light detecting means, said optical integrated device having a number of switching circuits coupled to the light detecting means and a number of common terminals coupled to the number of switching circuits for providing output data, in which the number of switching circuits are arranged such that the number of common terminals is the same regardless of the number of light incident surfaces in the light detecting means.

2. The optical pickup as set forth in claim 1, wherein the optical integrated device includes the first and second light sources.

3. The optical pickup as set forth in claim 2, wherein the optical integrated device includes the light detecting means and the first and second light sources houses in a single package.

4. The optical pickup as set forth in claim 3, wherein the optical integrated device has the light sources disposed side by side and the light detecting means disposed in the direction of light emission from the light sources.

5. The optical pickup as set forth in claim 2, wherein the first light source emits a light having a first wavelength and the second light source emits a light having a second wavelength.

6. An optical disc drive using an optical pickup which detects a return light from an optical disc and provides as output a result of the light detection, and adapted to read data from the optical disc by processing the light detection result output from the optical pickup, the optical pickup comprising:

optical means having a first light source and a second light source for emitting and converging a light onto an optical disc;

light detecting means having at least a first portion and a second portion each having a plurality of light incident surfaces for detecting light, in which the first and second portions are provided on a semiconductor substrate and in which each light incident surface of said first portion is separate from each other and each light incident surface of said second portion is separate from each other; and an optical integrated device housing the light detecting means, said optical integrated device having a number of switching circuits coupled to the light detecting means and a number of common terminals coupled to the number of switching circuits for providing output data, in which the number of switching circuits are arranged such that the number of common terminals is the same regardless of the number of light incident surfaces in the light detecting means.

7. The optical pickup as set forth in claim 6, wherein the optical integrated device includes the first and second light sources.

8. The optical pickup as set forth in claim 7, wherein the optical integrated device includes the light detecting means and the first and second light sources houses in a single package.

9. The optical pickup as set forth in claim 8, wherein the optical integrated device has the light sources disposed side by side and the light detecting means disposed in the direction of light emission from the light sources.

10. The optical pickup as set forth in claim 7, wherein the first light source emits a light having a first wavelength and the second light source emits a light having a second wavelength.

11. The optical disc drive as set forth in claim 6, wherein based on an output signal produced from a result of the light detection by the light detecting means, an optical disc set in the optical disc drive is subject to a tracking control and/or focus control corresponding to the type thereof.

* * * * *